United States Patent [19]

Williams, Jr.

[11] Patent Number: 4,889,731
[45] Date of Patent: Dec. 26, 1989

[54] PACKAGE HAVING PEELABLE FILM

[75] Inventor: Allen C. Williams, Jr., Spartanburg, S.C.

[73] Assignee: W. R. Grace & Co.-Conn., Duncan, S.C.

[21] Appl. No.: 156,270

[22] Filed: Feb. 12, 1988

[51] Int. Cl.⁴ .............................................. B65D 85/00
[52] U.S. Cl. .................................... 426/106; 426/122; 426/123; 426/127; 426/129; 206/484.1; 206/484.2; 206/620; 206/630; 206/631; 206/632; 206/633
[58] Field of Search .............. 426/122, 123, 127, 129, 426/106; 206/632, 633, 484.1, 484.2, 620, 631, 630

[56] References Cited

U.S. PATENT DOCUMENTS

| Re. 27,872 | 1/1974 | Esty | 229/14 B |
|---|---|---|---|
| Re. 30,009 | 5/1979 | Perdue et al. | 53/433 |
| 2,623,826 | 12/1952 | Grindstead | 426/129 |
| 2,925,346 | 2/1960 | Harper et al. | 426/129 |
| 3,360,382 | 12/1967 | Miller | 426/129 |
| 3,491,504 | 1/1970 | Young et al. | 53/22 |
| 3,574,642 | 4/1971 | Weinke | 426/129 |
| 3,647,485 | 3/1972 | Seiferth et al. | 426/129 |
| 3,663,240 | 5/1972 | Seiferth et al. | 426/129 |
| 3,681,092 | 8/1972 | Titchenal et al. | 426/129 |
| 3,713,849 | 1/1973 | Grindrod et al. | 426/129 |
| 4,055,672 | 10/1977 | Hirsch et al. | 426/129 |
| 4,522,835 | 6/1985 | Woodruff et al. | 426/264 |
| 4,638,913 | 1/1987 | Howe, Jr. | 206/632 |

FOREIGN PATENT DOCUMENTS

| 890766 | 1/1972 | Canada . | |
|---|---|---|---|
| 2539351 | 3/1977 | Fed. Rep. of Germany | 426/129 |
| 1258357 | 3/1961 | France . | |
| 1186978 | 4/1970 | United Kingdom . | |
| 1199998 | 7/1970 | United Kingdom . | |
| 1378140 | 12/1974 | United Kingdom . | |

Primary Examiner—Peter Chin
Attorney, Agent, or Firm—William D. Lee, Jr.; Mark B. Quatt; Jennifer L. Skord

[57] ABSTRACT

A package for extended storage and in-store display of fresh red meat is disclosed. Preferably the package is made by a vacuum skin packaging process wherein the forming web is a composite peelable film having a peelable oxygen barrier layer and an oxygen permeable skin layer which remains to enclose the product when the peelable film is removed after storing. A means and method for readily initiating the peeling process is provided by a combination of a manual pull tab and selected perforations of the forming web.

9 Claims, 3 Drawing Sheets

PACKAGE HAVING PEELABLE FILM

FIELD OF THE INVENTION

This invention relates generally to packages having a peelable film or separable skin. Particularly, the present invention relates to vacuum skin packages wherein the barrier layer or layers may be peeled and separated from the non-barrier layer or layers and to the package configuration which provides easy initiation of the peeling process.

BACKGROUND OF THE INVENTION

Skin packaging can be classified as a vacuum forming process for thermoformable polymeric films. However, the term "vacuum skin packaging" or VSP as it is referred to hereinafter, refers not to the fact that the thermoformable film is formed around the product by vacuum or differential air pressure which, indeed it is, but more to the fact that the product is packaged under vacuum and the space containing the product is evacuated. For a number of products there is a need for the film formed around each product to be a barrier to oxygen, air, and other gases.

In conventional skin packaging, a backing board which is porous or which is perforated is used so that a vacuum may be drawn directly through the backing board. In vacuum skin packaging processes, generally, a vacuum chamber with an open top is used. A product on an impervious backing board is placed on a platform within the vacuum chamber. The opening to the upper chamber is covered by a sheet of film which is clamped tightly against the chamber to form a vacuum tight closure. The chamber is evacuated while the film is heated to its forming and softening temperature. The platform is then raised to drive the product into the softened film and air pressure is used above the film to force it tightly around the product. A similar type process is disclosed in French Patent No. 1,258,357 which issued to Alain G. Bresson on Mar. 6, 1961.

In another version of vacuum skin packaging in the prior art, which is disclosed in U.S. Pat. No. 3,491,504, which issued to W. E. Young et al on Jan. 27, 1970, heat softened film is physically moved down over a stationary product and, with the use of differential air pressure, the softened thermoplastic film is molded onto the product.

In U.S. Pat. No. Re. 30,009, which was reissued on May 29, 1979 to Richard R. Perdue et al, a thermoformable or heat softenable film sheet is drawn by differential air pressure against the concave interior surface of the upper portion of a vacuum chamber, the film is then heated by surface contact, and then, after evacuation of the chamber, air pressure is used to blow the film down over the product and against the backing board. The resulting package comprises the product positioned on the backing board which is gas impervious. The product is held on the backing board by the thermoformable film which has been formed around the product in the exact shape of the product so that it appears to be an almost invisible "skin." The thermoformable film or forming web, as stated previously, is also gas impervious and usually will consist of a number of layers each of which performs a specific function. The layer in contact with the product and backing member will be a sealing or heat sealable layer. An interior layer will typically be a barrier layer which comprises a vinylidene chloride copolymer or a hydrolyzed ethylene/vinyl-acetate copolymer, and the outer surface layer will be an abuse layer to protect the barrier layer from scratches, pin holes, or from moisture attack.

In U.S. Pat. No. 3,574,642 which issued on Apr. 13, 1971 to Carl Frederick Weinke, a package for a method of packaging meats is disclosed. The package includes an inner oxygen-permeable member which may be also gas flushed or evacuated. The package preserves the freshness of the meat until the meat is ready to be marketed to the consumer. For marketing, the outer wrapper is removed and the inner package is displayed to the consumer. Being oxygen-permeable, the inner wrapper admits oxygen to the interior of the package causing the fresh meat product to change to a bright red color which the consumer associates with freshness. The inner pouch of the Weinke package may consist of polyethylene film and the outer pouch may be cellophane film with a coating of saran (vinylidene chloride copolymer.) Another patent showing portions of fresh meat individually packaged in oxygen permeable plastic film and inserted into an outer container of impermeable film is U.S. Pat. No. 3,681,092 which issued to Oliver R. Titchnell et al on Aug. 1, 1972.

Another prior art package is described in U.S. Pat. No. 3,713,849 which issued to Paul E. Grindrod et al on Jan. 30, 1973. In the Grindrod et al patent a fresh meat package having an outer oxygen impermeable lamina which is readily and entirely peelable from an inner oxygen-permeable lamina is disclosed. The package includes means for initiating the peeling separation along an edge of the package. The outer oxygen barrier maintains meats in well preserved condition in spite of the purplish color which has low consumer appeal. Shortly prior to display for sale to the consumer the outer lamina is removed by the retailer and the product develops a healthy, bright red "bloom" due to the high oxygen through-put of the inner remaining film package. The material disclosed in Grindrod et al is a laminate of PVC/Saran and EVA/Saran. (EVA designates ethylene/vinyl-acetate copolymer and PVC designates polyvinyl-chloride.) The EVA and PVC layers are the inner layers and at the periphery of the package they are sealed together. The saran layers can be readily peeled from the respective EVA or PVC layers with gripping tabs that are provided.

Yet another peelable package is shown in U.S. Pat. No. 4,055,672 which issued on Oct. 25, 1977 to Arthur Hirsch et al. In the Hirsch et al patent a semi-rigid preformed tray of oxygen impermeable material is formed, a metal product placed therein, and then the tray is sealed around its upper periphery or flange area by a composite lid which has an inner layer of oxygen impermeable material, an adhesive layer, and an outer layer of oxygen impermeable material. When the package is ready for retail display, in order that oxygen can reach the fresh meat packaged within impermeable material, the outer, impermeable lid is peeled away so that the oxygen can penetrate through the remaining portion of the lid. Accordingly, another object of the present invention is to provide a package with a strippable or peelable barrier layer which is an improvement over prior art packages.

In a number of instances in order to preserve a meat product within an impermeable film, it is desirable to provide a modified atmosphere which may include inert gases such as nitrogen or the like or an atmosphere which has a mixture of gases such as oxygen and carbon dioxide to control the bacterial growth within a package. Typical packages are disclosed in U.S. Pat. No. Re. 27,872 which issued on Jan. 8, 1974 to J. J. Estes; U.S. Pat. No. 2,623,826 which issued on Dec. 30, 1952 to Sanford R. Grinstead; U.S. Pat. No. 3,360,382 was issued on Dec. 26, 1967 to H. V. Miller; U.S. Pat. No. 4,522,835 which issued on June 11, 1985 to Richard E. Woodriff; U. K. Patent No. 1,199,998 which was published July 22, 1970; Canadian Patent No. 890,766 which issued Jan. 18, 1972 to Charles M. Davison et al; U. K. Patent No. 1,378,140 which was published Dec. 18, 1974; and in U. K. Patent No. 1,186,978 which was published Apr. 8, 1970. U.S. Pat. No. 2,925,346 which issued Feb. 16, 1960 discloses a process of packaging cured meat products and inhibiting color degradation by removing oxygen and back filling the container with a gaseous oxide of nitrogen. Accordingly, it is another object of the present invention to provide a vacuum skin package which is suitable for and can be used with modified atmospheres.

In order to readily open packages where plastic film layers have been sealed together to close the package, various tear tabs and easy open mechanisms have been devised. One such easy-open, delaminating seal is disclosed in U.S. Pat. No. 4,638,913 which issued on Jan. 27, 1987 to Milton A. Howe, Jr. In this patent, two grippable film folds are provided to act as gripping tabs and the folds, when pulled apart, will rupture one of the outer layers of the sealed together film and delaminate the film to its edge. In such a case, of course, the bond strength between the two sealed together films must be greater than the layer-to-layer bond strength of the film. Accordingly, it is still another object of the invention to provide a package which it is readily openable.

The foregoing and other objects are achieved by the present invention which is described in the Summary of Invention below, and an embodiment of which is shown in the attached drawings, and which is further described in the detailed description. The advantages of the invention will become apparent to those skilled in the art upon reading this disclosure which is understood not to be limited to the embodiments described herein.

SUMMARY OF THE INVENTION

In one aspect, the present invention is a package having a peelable film layer comprising a product; a support web upon whose upper surface the product rests, said support web having at least one edge; a composite film enclosing the product, said composite film comprising: a skin layer sealed to the support web around the periphery of the product; and, a peelable layer coextruded with or laminated to the skin layer on the outer side of the package, the bond strength between the peelable and skin layers being of such strength that the two layers may be manually delaminated one from the other, said bond strength being less than the seal strength between the skin layer and support web; a header strip sealed to the upper surface of the support web adjacent an edge thereof; said composite film being superimposed over said strip but not adhered thereto, both the header strip and the composite film terminating at the edge of the support member whereby the composite film is readily separable from the header strip at said edge thereby forming a manually grippable pull tab; a series of perforations in the composite film arranged substantially in a line generally parallel to the edge of the header which is nearest the product, each perforation extending through the composite film and said line being located immediately adjacent to said header; the resistance of a peelable layer to tearing along the line of perforations being greater than that of the skin layer whereby when the pull tab is manually lifted the peelable layer will not tear along said line but the skin layer will tear as it remains sealed to the support web while the peelable layer is peeled away.

In another aspect, the present invention is a package having a peelable film layer comprising a product; a semi-rigid support on a lower web of thermoplastic material having a gas barrier coating or layer; a foaming web which has been formed by a vacuum skin packaging process around the product and sealed to the lower web around the periphery of the product; said forming web comprising: a multilayer skin film comprising the surface of the forming web which is sealed to the support web, said skin film being gas pervious; a multilayer peelable film, said peelable film having a gas barrier layer; the bond strength between the skin film and the peelable film being less than the bond strength between the skin film and support web and being weak enough to allow manual peeling of the peelable layer from the skin layer, non-stick means disposed along an edge of said support member for preventing sealing of the forming web to the support web and the area of said means whereby the unadhered forming web forms a manual pull tab; and, peel initiating means distributed adjacent to and along the length of the non-stick means on the side of said non-stick means opposite said edge, said peel initiating means initiating the rupture of the portion of said skin layer superimposed over the non-stick means from the remainder of the skin film whereby when the pull tab is pulled away from the support web the peeling of the peelable layer from the skin layer is initiated.

In still another aspect, the present invention includes a vacuum skin process wherein a product is packaged between a forming web and a support web wherein the improved method of initiating the forming web has a peelable film layer with a peeling process comprising the steps of providing a non-stick surface adjacent to one edge of the support web; providing a forming web having manually separable layers comprising a peelable barrier film and a gas pervious film wherein the rupture strength of a skin film is less than that of the peelable film; forming a vacuum skin package with the forming web sealed around the periphery of the product to the support web, the product being spaced apart from the non-stick surface in the unsealed portion of the forming web over the non-stick area thereby forming a manual pull tab, the seal strength of the skin film to the support web being greater than the rupture strength of the skin film; and, perforating the forming web with a plurality of perforations in a line adjacent to the non-stick surface whereby when the pull tab is manually pulled away from the support member the skin film ruptures leaving the peelable film free to be peeled off the skin film.

DESCRIPTION OF THE DRAWINGS

Appended hereto and made a part of this disclosure are drawings of illustrative embodiments of the invention in which.

Figure 1:
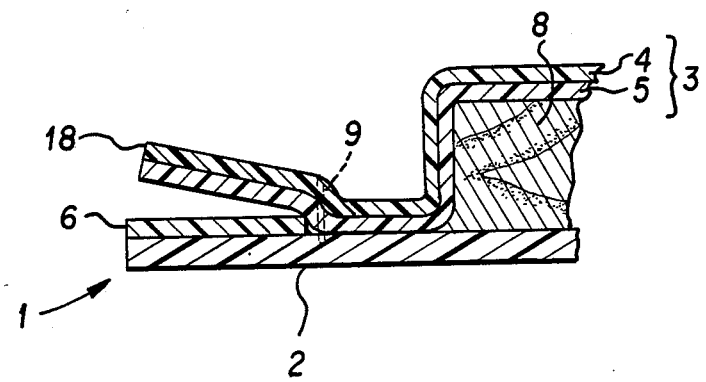
FIG. 1 is a partial cross section in perspective of a package which represents one embodiment of the present invention and shows the manually grippable pull tab.

the backing web 2. The peelable film does not contact the support web 2 as its function is to provide a removable gas barrier which will allow oxygen to penetrate the remaining skin film 5 and produce a bloom on the beefsteak product 8 in the manner disclosed in the above mentioned U.S. Pat. No. 3,574,642.

The barrier film or peelable film 4 is preferably a multilayer gas impermeable film comprising a plurality of layers including a barrier layer comprising a material selected from the group consisting of hydrolyzed ethylene/vinyl-acetate copolymers (EVOH) and vinylidene chloride copolymers (PVDC). A specific forming web which has been found satisfactory and is the best mode structure of a forming web at the time this application is being filed is a forming web which is separable into the permeable skin layer 5 and impermeable peelable layer 4 which have detailed construction features as follows:

Skin or Sealing Layer 5

Sealant Layer/Core Layer/Optical Layer
0.20–0.60   1.75–2.50   0.10–0.20 mils thickness Wherein:
Sealant = VLDPE fron Union Carbide, or,
EVA Copolymer having 4% to 12% VA from duPont
Core = VLDPE, or,
EVA Copolymer having 18% to 28% VA content
Optical = ULDPE from Dow, resins 4002A or 4002B Peelable layer 4

EVOH/LDPE(tie)+HDPE/EVOH/LDPE(tie)+HDPE/EVA/HDPE(outside)
      40%              60%         40%            60%
0.20       0.20        0.20        0.20        1.5       0.20 mils thickness Wherein:
EVOH = Ethylene/vinyl-alcohol from Evalca
LDPE(tie) = Adhesive, preferably binell from duPont
EVA = EVA copolymer having 18% VA
HDPE = High Density Polyethylene from USI

DETAILED DESCRIPTION

Looking first at FIG. 1, one embodiment of the present invention is represented by package 1. Package 1 comprises a supporting member or support web 2 on which product 8 has been placed. The product is preferably a cut of fresh red meat such as beef, lamb or veal and in most embodiments will be a beef cut such as a filet or beefsteak.

The support web 2 or backing member can be a flat, sheet of thermoplastic material, preferably polyvinyl chloride with a coating of a vinylidene chloride copolymer which is commonly known as saran. Any of the vinylidene chloride copolymers which are good barriers to gas can be used included the vinyl chloride comonomer and the methyl acrylate copolymer. The shape of the support web 2 is illustrated as being flat but can be formed into a tray.

Draped over and closely conforming to the shape of the product 8 is the composite film 3 which is hermetically sealed to the support web 2 around the periphery of the product 8 to enclose the product in a gas-tight manner. A preferred method of forming the composite film or web 3 over and around the product 8 and into a hermetically sealed condition with the support web 2 is to use a vacuum skin packaging process preferably as disclosed in U.S. Pat. No. Re. 30,009 mentioned above. When the composite film 3 is formed over the product 8 in a vacuum skin packaging process the composite film 3 is referred to as the forming web.

The composite film or forming web 3 comprises a peelable film 4 and a skin film 5 or sealable film. The skin film 5, as can be seen in FIG. 1, is sealed directly to In the preferred peelable film above it is seen that in order to achieve very good barrier properties two layers of EVOH are employed. The first EVOH layer is the interface layer with the ULDPE layer in the sealant film 5. The interface layers; EVOH and ULDPE, are relatively imcompatible polymers and when coextruded together form a very weak interface and can be readily peeled apart.

To make the composite film or web, a coextrusion process similar to that described in U.S. Pat. No. 4,287,151 to Esakov et al on Sept. 1, 1981 may be employed. Suitable annular multilayer dies must, of course, be used and these are well known to those familiar with the art of coextruding multilayer thermoplastic films.

Figure 2:
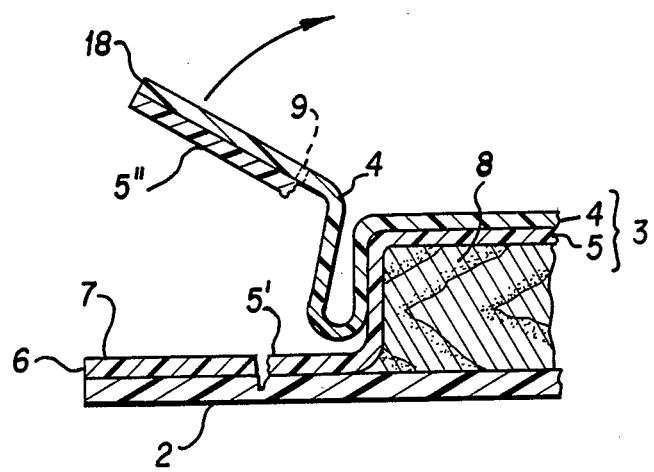
FIG. 2 is the same view as FIG. 1 but illustrates the beginning of the peeling operation.

The preferred film described above will seal to a saran coated PVC support web with a bond strength greater than the strength required to delaminate the peelable film 4 from the skin film 5 as in FIG. 2.

Figure 3:
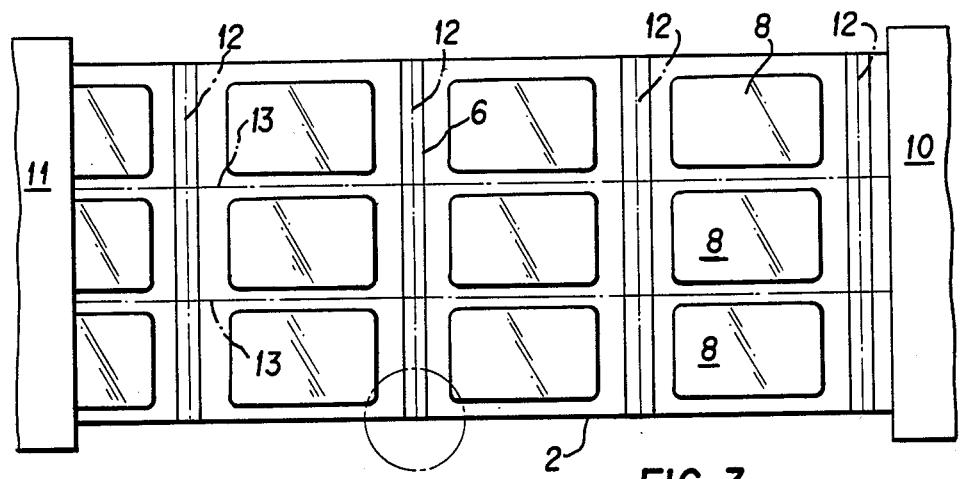
FIG. 3 is a schematic representation of a top plan view of an array of packages made according to the present invention as they move from a vacuum packaging station to a severing station, the packages being arranged on a support web in rows and columns.

Turning now to FIG. 3, a vacuum skin packaging chamber 10 is represented on the right hand side and a severing or cutting station 11 is represented on the left hand side of FIG. 3. Prior to entering the vacuum skin packaging station 10 the products 8 have been arranged in rows and columns on support member 2 prior to entering the station 10 where a vacuum skin packaging process, preferably according to the method described in U.S. Pat. No. Re. 30,009 mentioned above, is employed. Also, another patent publication which discloses product being placed on a support member, vacuum skin packaged, and then cut and severed from the support web is UK No. 2,130,166 granted on Dec. 17, 1986.

Figure 4:
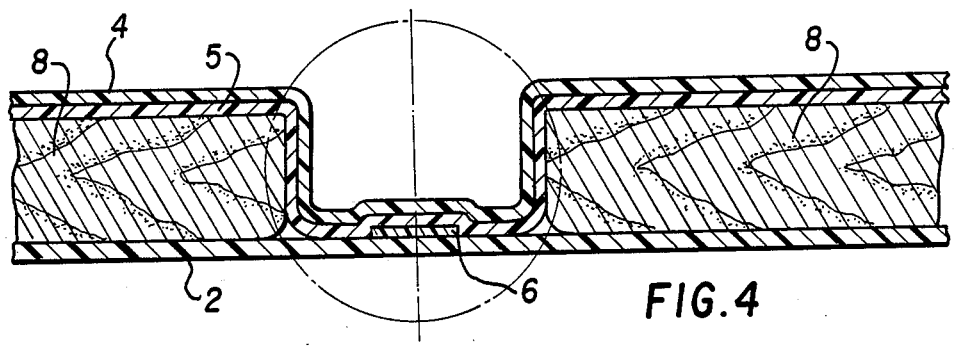
FIG. 4 is a blow up of a section from FIG. 3.

In the present invention, once the product is loaded onto the support member 2 in rows and columns as shown in FIG. 3 and prior to entering the vacuum skin packaging chamber 10, a strip of tape 6 has been put down transversely across the support member 2 between each column of products 8. This film which has an adhesive surface to stick to the support web 2 will have a non-stick upper surface which can be a surface which has a coating of wax, Teflon, or similar material to which the skin or sealing film 5 will not adhere during the vacuum skin packaging process. Thus, the packages 8 as they emerge from the vacuum skin packaging chamber 10 will have a cross section which is schematically represented by the blow up in FIG. 4 where it can be seen that the tape 6 is placed between the columns of packages 8 preferably on the center line between these columns. As an alternate to using a tape a non-stick material could be coated onto the film in this position such as a roller similar to a print roller making such a coating transversely across the support web 2.

Figure 6:
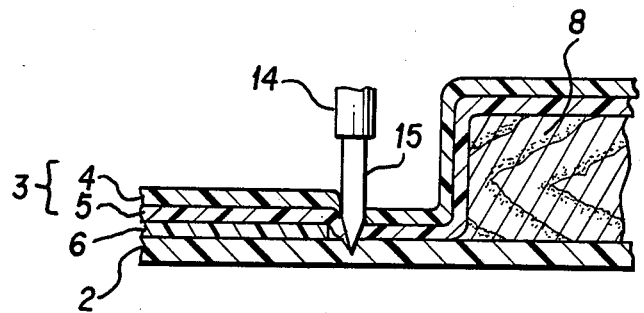
FIG. 6 is a continuation of the perforation process shown in FIG. 5 and represents the preferred depth of penetration of the perforating knife or member.
Figure 7:
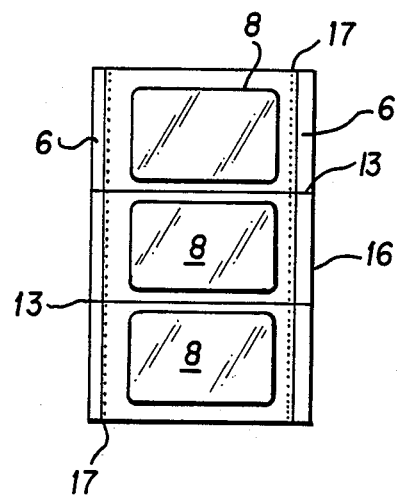
FIG. 7 shows a column of packages with the arrays of perforations adjacent the pull tab of each edge of the packages; and, FIG. 8 is a top plan view of one of the packages from the column shown in FIG. 7 having been severed to be an individual package.

The perforating step, hereinafter described in more detail, can be performed prior to entering the severing station 11 or in conjunction with the severing process or a column of products 8 can be detached or severed from the continuous support web 2 as shown in FIG. 7. The line of perforations 17 are placed preferably in the manner shown in FIGS. 5 and 6.

Figure 5:
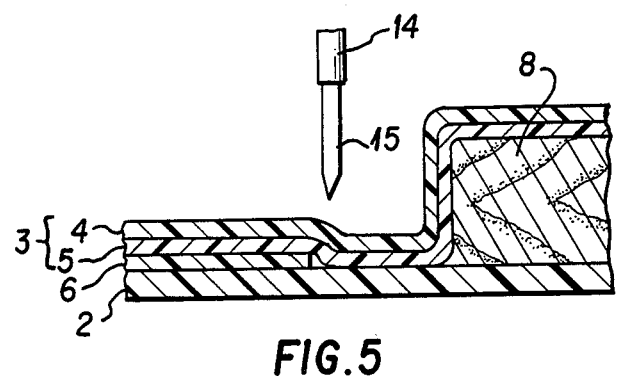
FIG. 5 is a schematic representation of the edge of a package immediately prior to the perforation operation.
Figure 8:
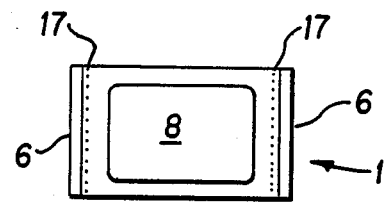

Looking now at FIGS. 5 and 6, perforating blades 15 carried by rack 14 are shown poised above the forming web 3 in the area immediately adjacent to the non-stick strip 6 so that when the perforating needles or blades 15 are driven downwardly penetration is made as shown in FIG. 6 with the result that no penetration is made through the non-stick area 6 but the penetration through the layers 4 and 5 is made completely all the way into the support web 2. It has been surprisingly found that in order to make an effective line of perforations as shown in FIGS. 7 and 8 that the perforations have to be spaced apart from the non-stick strip 6. Any suitable blade or needle or punch will serve the purpose including the use of a serrated knife as long as the small holes or perforations are cut into the package immediately adjacent the header label or non stick strips 6. Because this film is not sealed over the non stick strip 6 it will provide a gripping tab as illustrated in FIG. 1.

Referring now to FIG. 1, the manual gripping tab 18 which has been found as explained below is shown partially separated from the header or non-stick tape 6 and the perforation line left by the action of the needle or punch 15 is shown. When the tab 18 is pulled in the direction of the arrow in FIG. 2 the sealable film 5 ruptures in the area adjacent the header 6 where the perforation 9 has been placed leaving sealed segment 5 still sealed to the supporting web 2 and ruptured segment 5" forms part of a tear tab which, as it is further pulled and rotated in the direction of the arrow, will delaminate the barrier or peelable film 4 from the skin or permeable film 5. Thus, the product 8 is left completely covered by the permeable skin film 5.

The line of perforations enhance the tear process and provides a straight line along which the tear takes place. The spacing and size of the holes is determined by the thickness of the film and the different film compositions and such determination can be done by those skilled in the art. For the thickness of film of the preferred forming web set forth above, a perforation distribution of 5 per inch with each perforation being about 1/16 inch in width has proven satisfactory. It appears that from the work done that smaller holes closer together work more satisfactorily. Of course, it is necessary that the rupture or tear strength of the perforated barrier film 4 be greater than that of the perforated sealable film 5. The line of perforations seems to accentuate the difference in tear strength or rupture resistance and allows for an easy tear. Thus, a beefsteak, for example, which was in a vacuum package during a storage period which could be 14 to 28 days during which time the beefsteak was a purplish color will now bloom into its bright red color, usually within 30 minutes to one hour, after the peelable barrier layer has been removed thus exposing the surface of the meat to oxygen as it permeates the film.

An alternate way of applying the perforations would be to use a serrated wheel which would be rolled across the column of packages at the appropriate area adjacent the header.

Also, the header could include instructions or other labeling information on the non-stick surface 7 as the package 1 with the peelable film 4 striped off is the package that would be in the retail display case at the supermarket.

Upon reading and becoming familiar with the disclosure herein, equivalent film combinations and package configurations will likely become evident or obvious to those skilled in the art. However, the present invention is to be limited only by the scope of the following claims:

I claim:

1. A package having a peelable film layer comprising:
   (a) a product;
   (b) a support web upon whose upper surface the product rests, said support web having at least one edge;
   (c) a composite film enclosing the product said composite film comprising:
      (1) a skin layer sealed to the support web around the periphery of the product; and,
      (2) a peelable layer laminated or coextruded to the skin layer on the outer side of the package; the bond strength between the peelable and skin layers being of such strength that the two layers may be manually separated one from the other, said bond strength being less than the seal strength between the skin layer and the support web;
   (d) a header strip sealed to the upper surface of the support web adjacent an edge thereof;
   (e) said composite film being superimposed over said strip but not adhered thereto, both the header strip and composite film terminating at the edge of the support member whereby the composite film is readily separable from the header strip at said edge thereby forming a manually grippable pull tab;
   (f) a series of perforations in the composite film arranged substantially in a line generally parallel to the edge of the header which edge is nearest the product, each perforation extending through the composite film and said line being located immediately adjacent to said header;
   (g) the resistance of the peelable layer to tearing along the line of perforations being greater than that of the skin layer whereby when the pull tab is gripped and lifted the peelable layer will not tear along said line but the skin layer will tear as it remains sealed to the support web while the peelable layer is peeled away.

2. The package of claim 1 wherein the line of perforations is substantially straight.

3. The package of claim 1 wherein the support member is gas impervious.

4. The package of claim 3 wherein the peelable layer is gas impervious.

5. The package of claim 4 wherein the peelable layer comprises a plurality of layers of thermoplastic material at least one of which is a gas barrier layer.

6. The package of claim 5 wherein the skin layer comprises a plurality of layers of thermoplastic film and the skin layer has relatively high oxygen permeability.

7. The package of claim 6 wherein the interior of the package which contains the product has been evacuated.

8. The package of claim 7 wherein the product is fresh meat products.

9. A package having a peelable film layer comprising:
   (a) a product;
   (b) a semi-rigid support or lower web which is a base of thermoplastic material having a gas barrier coating or layer;
   (c) a forming web which has been formed by a vacuum skin packaging process around the product and sealed to the lower web around the periphery of the product;
   (d) said forming web being formed by coextrusion and comprising:
      (1) a multilayer skin film comprising the surface of the forming web which is sealed to the support web, said skin film being gas pervious;
      (2) a multilayer peelable film, said peelable film having a gas barrier layer;
      (3) the bond strength between the skin film and peelable film being less than the bond strength between the skin film and support web and being weak enough to allow manual peeling of the peelable layer from the skin layer,
   (e) non-stick means disposed along an edge of said support member for preventing sealing of the forming web to the support web in the area of said means whereby the unadhered forming web forms a manual pull tab; said non-stick means comprising a header strip with a non-stick surface, and,
   (f) peel initiating means distributed adjacent to and along the length of the non-stick means on the side of said non-stick means opposite said edge, said peel initiating means initiating the rupture of the portion of said skin layer superimposed over the non-stick means from the remainder of the skin film whereby when the pull tab is pulled away from the support web the peeling of the peelable layer from the skin layer is initiated, said peel initiating means comprising a series of perforations that penetrate the forming web.

* * * * *